United States Patent [19]

Watanabe

[11] Patent Number: 4,611,218

[45] Date of Patent: Sep. 9, 1986

[54] THERMAL HEAD POSITIONING APPARATUS WITH RIBBON CASSETTE

[75] Inventor: Junji Watanabe, Yokohama, Japan

[73] Assignee: Kabushiki Kaisha Toshiba, Japan

[21] Appl. No.: 686,386

[22] Filed: Dec. 26, 1984

[30] Foreign Application Priority Data

Dec. 27, 1983 [JP] Japan ................................ 58-246349

[51] Int. Cl.[4] ............................................ G01D 15/10

[52] U.S. Cl. ............................... 346/76 PH; 346/106; 400/208; 400/120

[58] Field of Search ................ 346/76 PH, 76 R, 136, 346/105, 106; 250/319; 400/120, 224.2, 240.3, 356, 207, 208; 214/216 PH, 216; 242/144

[56] References Cited

U.S. PATENT DOCUMENTS 4,496,955 1/1985 Maeyama et al. ............ 346/76 PH 4,507,667 3/1985 Tsuboi ........................... 346/76 PH

*Primary Examiner*—A. Evans

*Attorney, Agent, or Firm*—Finnegan, Henderson, Farabow, Garrett & Dunner

[57] ABSTRACT

An image transfer type image building apparatus includes a platen and a recording head, the latter being adapted to come in contact or out of contact with the former. A cassette containing a supply of thermal transfer ribbon wound on a pair of winding cores is positioned opposite the platen with respect to the recording head. A driving power source for displacing the recording head is positioned opposite the recording head with respect to the cassette. Driving power is transmitted from the driving power source to the recording head via power transmitting members which extend between the winding cores. The cassette is detachably secured to a frame member of the apparatus. The driving power source is mounted outside the cassette permitting the cassette structure to be designed in smaller dimensions.

7 Claims, 22 Drawing Figures

THERMAL HEAD POSITIONING APPARATUS WITH RIBBON CASSETTE

BACKGROUND OF THE INVENTION

1. Field of the Invention

The present invention relates to a transfer type image building apparatus for building an image by a coloring agent from image transference material to material to be image transferred, and more particularly to improvement of an image building apparatus adapted to displace the recording head to come in contact or out of contact with the platen while the image transference material extending between both the winding cores of a cassette is located between the recording head and the platen.

2. Description of the Prior Art

A thermal transfer type image building apparatus is hitherto known as typical transfer type image building apparatus. The thermal transfer type image building apparatus is constructed such that image transference is achieved with the aid of a thermal head which serves as a recording head and uses image transference material with a thermally fusible or vaporizable coloring agent coated thereon. Since the conventional thermal transfer type image building apparatus is designed in small dimensions, is manufactured at an inexpensive cost, generates less noise and has the capability of using plain paper as the material to be image transferred, it is widely put in practical use not only for the purpose of recording outputs from computer, word processor or the like but also as a copying machine.

The conventional thermal transfer type image building apparatus is generally constructed such that the thermal head is adapted to come in contact or out of contact with a platen roller so that when the image is to be transferred, the thermal head comes in pressure contact with the platen roller while image transference material and paper are interposed therebetween. After completion of image transference the thermal head is displaced away from the platen roller to be ready for next image transference. Usually, image transference material is prepared in the open reel shaped configuration in which both ends are fixedly anchored at winding cores. The driving mechanism for allowing the platen roller to come in contact and out of contact with the platen roller is arranged in the area between both the winding cores around which image transference material is wound.

However, it is found that the conventional open reel shaped image transference material is handled only with much difficulty. For instance, when the existent image transference material must be replaced with another new one having a different color or when a new one must be fitted to the apparatus after the old one is consumed, it is inconvenient and time-consuming to remove the existent image transference material from the apparatus and then fit new material to the apparatus.

To obviate this problem there have been made a proposal for receiving image transference material in a case in the form of cassette to simplify handling of the material.

However, in spite of the proposal made in that way, the conventional apparatus still has a drawback of requiring wider space for mounting the driving mechanism of the cassette case in which image transference material is contained. This is attributable to the fact that the driving mechanism of the conventional apparatus for allowing the recording head to come in contact or out of contact with the platen must be arranged in the area between both the winding cores about which image transference material is extended.

SUMMARY OF THE INVENTION

Thus, the present invention has been made with the foregoing background in mind and its object resides in providing an image building apparatus of the early-mentioned type which can use image transference material incased in a cassette without any necessity for increased space for the cassette.

To accomplish the above object there is proposed according to the present invention an improved image building apparatus of the early mentioned type, wherein the improvement consists in that driving power source for displacing the recording head is disposed outside the image transference material receiving section and driving power transmitting members are extended in the area as defined between a pair of winding cores whereby driving force is transmitted to the recording head via the driving power transmitting members.

According to the invention there is no necessity for increased space for arranging the driving power source between both the winding cores as is seen with the conventional apparatus. As a result, the image transference material receiving section can be designed in smaller dimensions. Further, any type of driving means such as motor, magnet or the like can be selected as driving power source as required, because the apparatus of the invention has no restriction relative to space required for mounting driving power source.

Other objects, features and advantages will be more clearly apparent from reading of the following description which has been made in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in a greater detail hereunder with reference to the accompanying drawings which illustrate preferred embodiments thereof.

Figure 1:
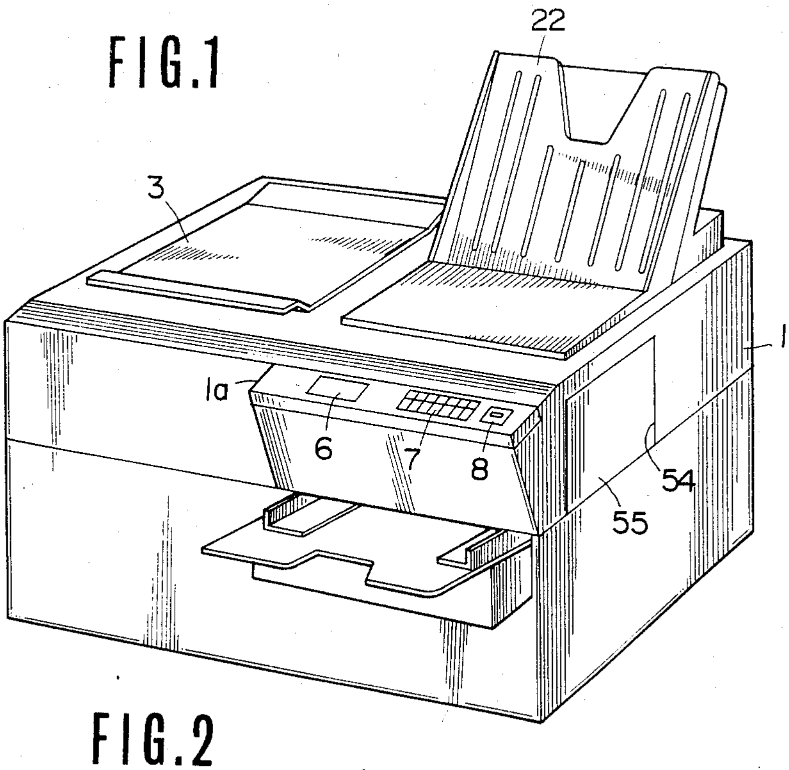
FIG. 1 is a perspective view of an image building apparatus in accordance with an embodiment of the invention.
Figure 2:
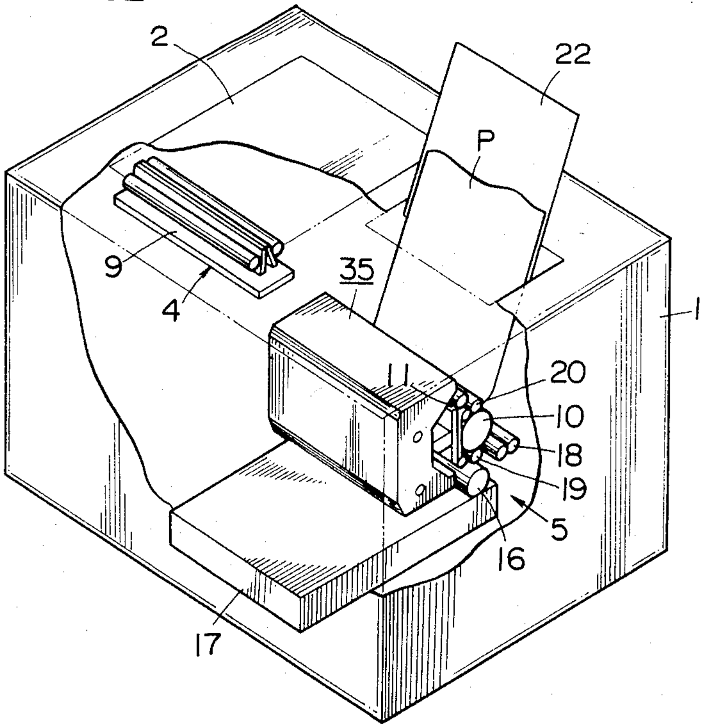
FIG. 2 is a partially sectioned perspective view of the image building apparatus in FIG. 1.

FIG. 1 illustrates an image building apparatus of the invention by way of perspective view and FIG. 2 illustrates schematic structure of the same by way of partially sectioned perspective view. In FIGS. 1 and 2 reference numeral 1 designates a housing of the image building apparatus and a control panel 1*a* is provided on the upper part of the front wall surface of the housing 1. Further, the apparatus is provided with an original holding board 2 on the lefthand side of the housing 1 while an original scanning section 4 (scanner section) for scanning an original on the original holding board 2 is disposed in the area located below the holding board and an image building section 5 (printer section) is disposed on the righthand side of the interior of the housing 1.

On the control panel 1*a* are arranged a display 6, a copying number determining section comprising ten keys 7, buttons 8 and others.

As schematically illustrated in FIG. 2, the original scanning section 4 is constructed such that the original set on the original holding board 2 is optically scanned by reciprocable movement of the movable scanning portion 9 in the optical exposure system and thus scanned optical information is then input into the image building section 5 by way of photoelectric conversion.

Figure 3:
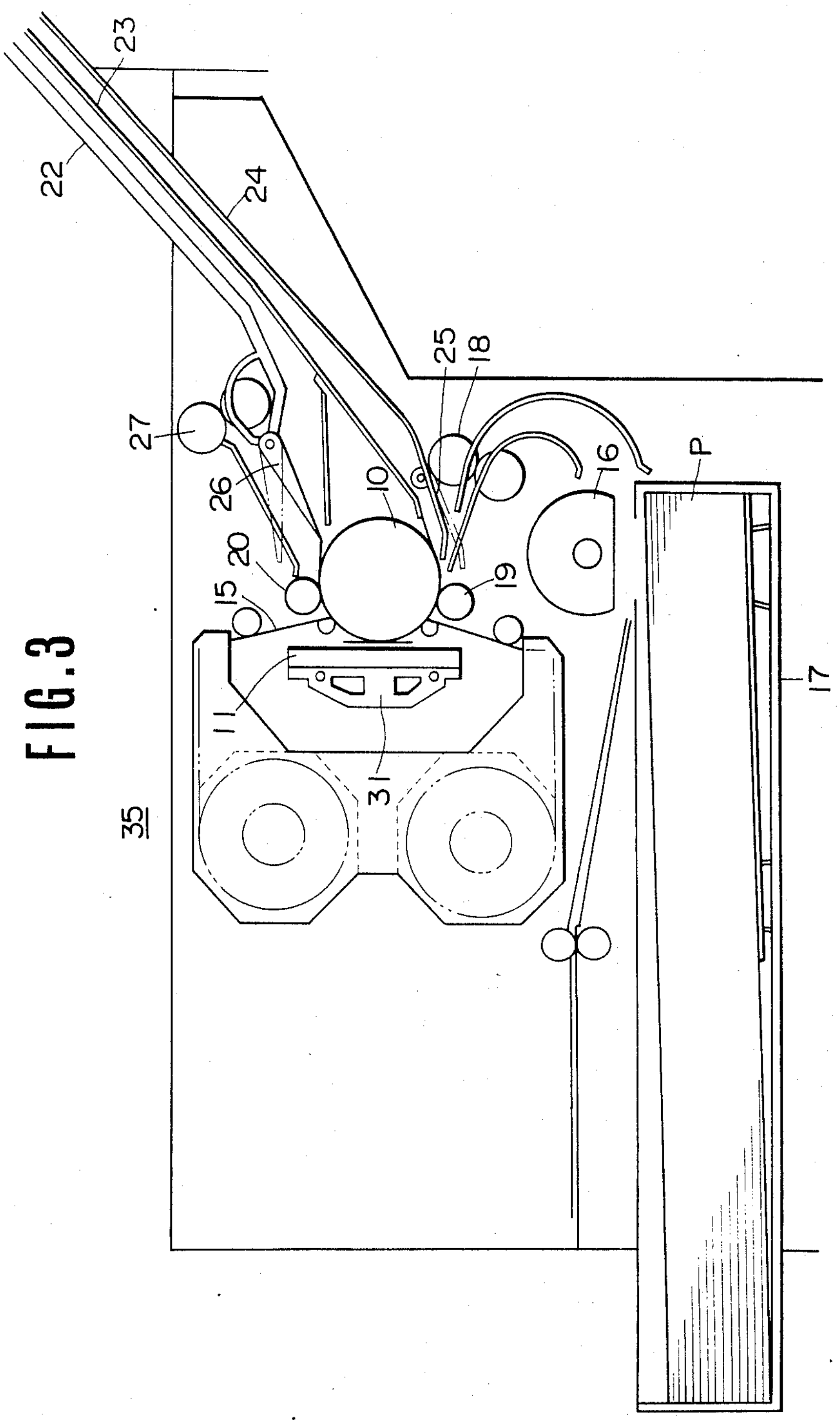
FIG. 3 is a vertical sectional side view of the image building apparatus schematically illustrating the structure of the apparatus.

The image building section 5 is constructed as illustrated in FIGS. 2 and 3. Specifically, a platen 10 is located at the substantially central part of the image building section 5 and a thermal head 11 serving as a recording head is located at a position in front of the platen 10 (leftwardly of the latter as seen in FIG. 3) so as to come in contact or out of contact with the platen.

Further, between the thermal head 11 and the platen 10 is interposed a thermal transfer ribbon 15 (ink ribbon) which serves as image transfer material. As paper P is thrust against the platen 10 while the thermal transfer ribbon 15 is interposed therebetween and heating elements (not shown) arranged in the line-dot shaped configuration on the thermal head 11 are heated up in response to image information, the coloring agent (ink) becomes molten and is then transferred to paper P.

A paper feeding roller 16 is disposed at the position located downwardly of the platen 10 so that a number of papers P in the paper feeding cassette 17 are taken from the latter one by one. After paper P is taken, it reaches a pair of resist rollers 18 located above the paper feeding roller 16 so that the position of the foremost end of paper is corrected. Thereafter, it is conveyed toward the platen 10 and it is wound about the platen 10 with the aid of thrusting rollers 19 and 20.

Figure 4:
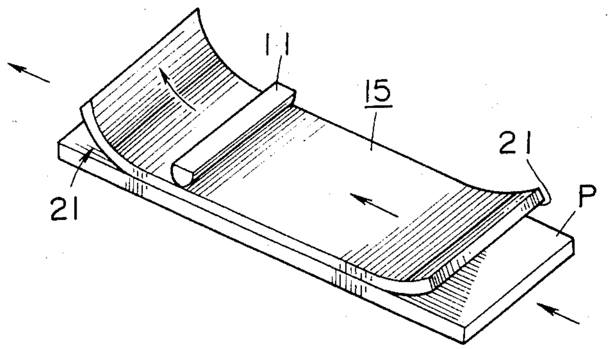
FIG. 4 is a perspective view schematically illustrating how image transferring is effected.

At this moment, the thermal head 11 thrusts paper P against the platen 10 with the thermal transfer ribbon 15 interposed therebetween so that ink 21 on the thermal transfer ribbon 15 serving as the coloring agent is transferred to paper P in the molten state, as schematically illustrated in FIG. 4.

Figure 5:
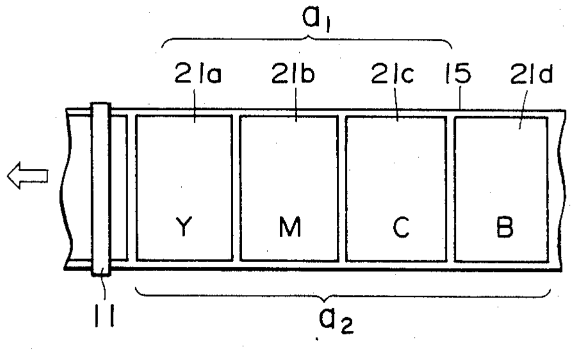
FIG. 5 is a schematic plan view of a thermal transfer ribbon illustrating how ink is coated thereon.

The thermal transfer ribbon 15 has three ink sections 21*a*, 21*b* and 21*c* arranged one after another, the ink section 21*a* being allocated to yellow (Y), the ink section 21*b* being to magenta (M) and the ink section 21*c* being to cyan (C). Sections 21*a*, 21*b* and 21*c* have substantially the same size as that of paper P, as identified by the area $a_1$ in FIG. 5. Alternatively, the thermal transfer ribbon 15 has four sections 21*a*, 21*b*, 21*c* and 21*d* arranged one after another, the ink section 21*a* being allocated to yellow (Y), the ink section 21*b* being to magenta (M), the ink section 21*c* being to cyan (C) and the ink section 21*d* being to black (B), as identified by the area $a_2$ in the drawing. Paper P is restored to its original position with respect to the thermal head 11 by rotation of platen 10 each time one color is transferred thereto, and the same step of color transferring is repeated by the number of ink sections transferred strictly in accordance with the predetermined order of superimposing.

The type of thermal transfer ribbon with black ink section 21*d* added thereto is intended to be in use for the case where black color is required to appear clearly. However, black color can be substantially created without any use of black ink section 21*d* by superimposing the other three colors one above another.

Thus, paper P is caused to reciprocably move about the platen 10 a number of rotation of the latter by times equal to the number of colors. During reciprocable movement of paper P made in that way it is brought to first and second guides 23 and 24 which are disposed one above another at the position located downwardly of the paper discharging tray 22.

Reciprocable movement of paper P will be described in more detail with reference to FIGS. 6(A) to (D). First, paper P is delivered from the paper feeding cassette 17 and it is then wound about the platen 10 via the resist rollers 18 and the first distributing guide 25 (see FIG. 6(A)).

Next, the platen 10 is rotated by means of a pulse motor (not shown) serving as a driving power source so that paper P is conveyed in the predetermined direction. At the same time heating elements (not shown)

arranged in the line-dot shaped configuration on the thermal head 11 are heated up in response to image information and thereby ink 21 on the thermal transfer ribbon 15 is transferred to paper P.

Figure 6A:
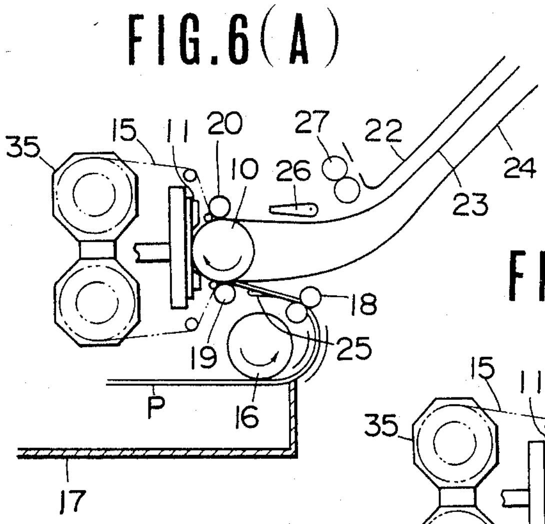
FIGS. 6(A) to (D) are fragmental vertical sectional side views of the apparatus, illustrating movement of paper during muti-color transferring operation.
Figure 6B:
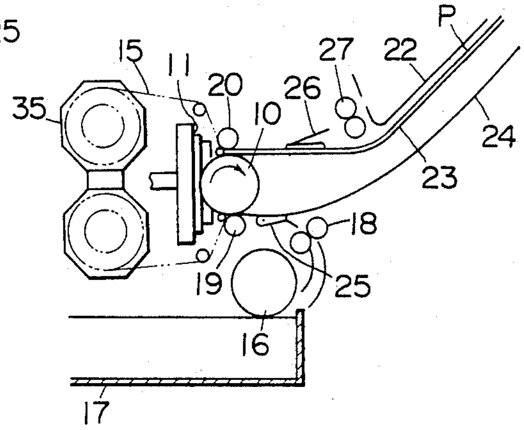

Paper P which has passed by the platen 10 is conveyed via the second distributing guide 26 onto the first guide 23 extending along the paper discharging tray 22 at the position located below the latter (see FIG. 6(B)).

Figure 6C:
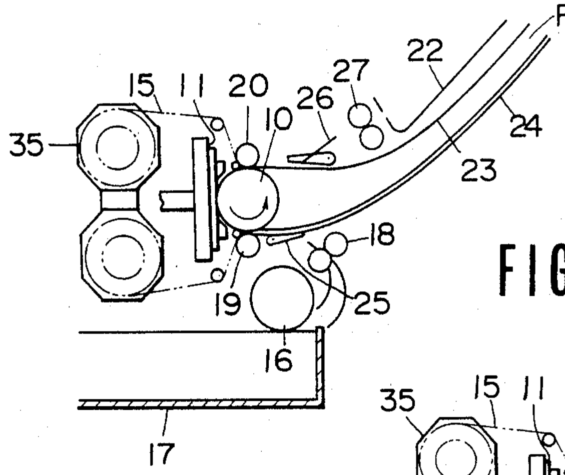

On completion of transference of ink 21 constituting one color to paper P the platen 10 is rotated in the reverse direction and the first distributing guide 25 is turned to another position whereby paper P is conveyed back to the second guide 24 which extends along the first guide 23 at the position located below the latter (see FIG. 6(C)).

Thus, plural number of colors can be transferred to paper P a number of reciprocable movement of the latter by times equal to the number of colors in the above-described manner.

Figure 6D:
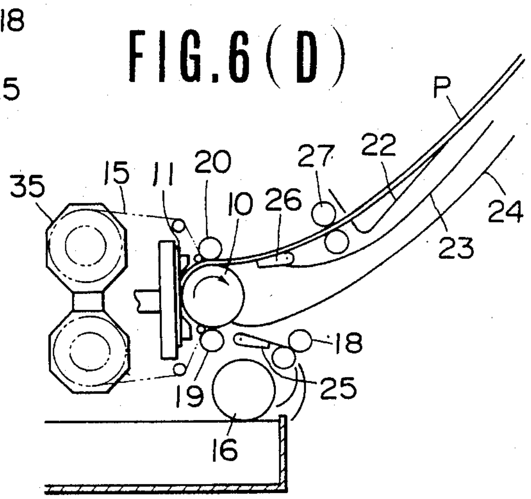

After completion of transference of ink 21 of all colors to paper P the latter is brought to a pair of paper discharging rollers 27 via the second distributing guide 26 and it is then discharged onto the paper discharging tray 22 (see FIG. 6(D)).

Figure 7:
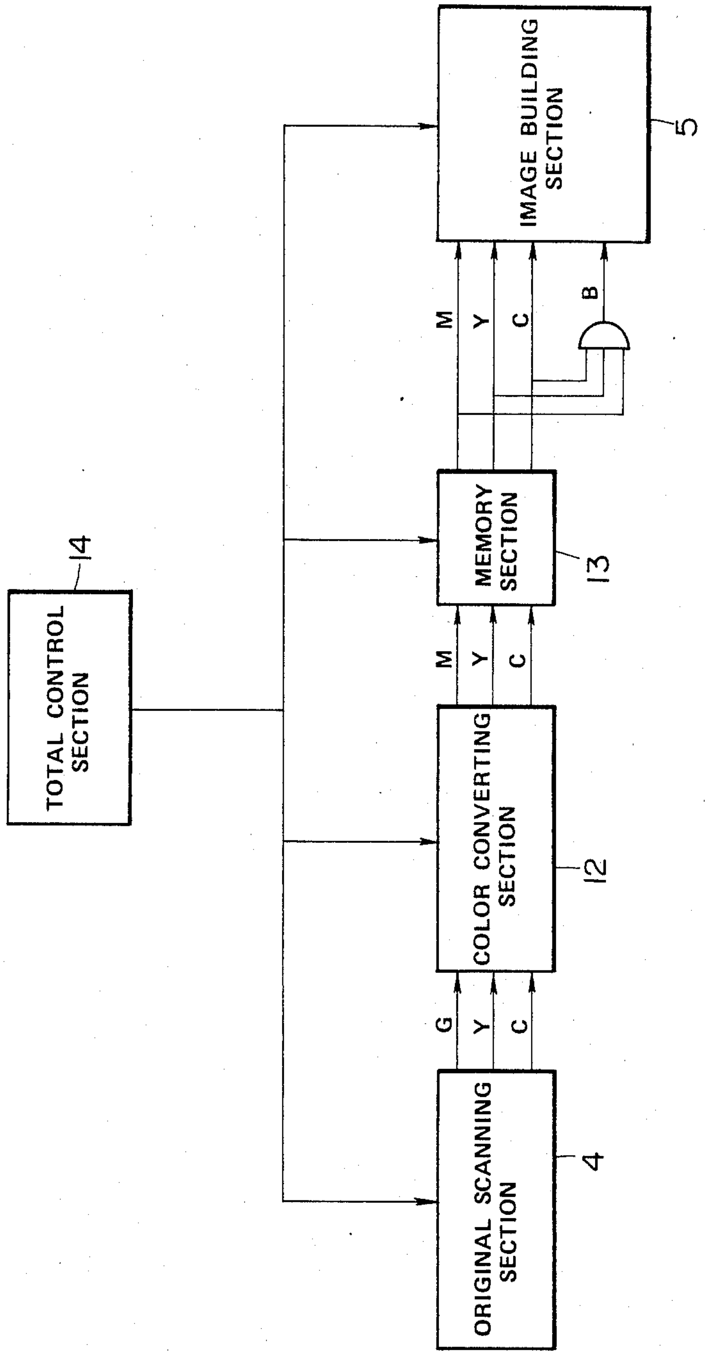
FIG. 7 is a block diagram schematically illustrating essential components constituting a thermal transfer unit incorporated in the apparatus.

As schematically illustrated in FIG. 7, the image building apparatus is constructed by a combination of original scanning section 4, color converting section 12, memory 13, image building section 5 and total controlling section 14.

Specifically, the value of each of color components comprising green (G), yellow (Y) and cyan (C) detected by the original scanning section 4 is converted into magenta (M), yellow (Y) and cyan (C) constituting printing medium in the color converting section 12 and this converted value is stored together with information concerning the position on an original in the storing section 13 with respect to each of the colors. The value is read from the memory 13 so that printing medium constituted by magenta (M), yellow (Y), cyan (C) and black (B) (in this case black represents AND output from magenta (M), yellow (Y) and cyan (C)) is transferred to paper P in the image building section 5. Incidentally, the total controlling section 14 is adapted to control all of the original scanning section 4, the color converting section 12, the memory section 13 and the image building section 5.

Further, the paper discharging rollers 27, the paper discharging tray 22 and the first and second guides 23 and 24 are constructed in the form of an unit which can be removed from the apparatus as required.

Figure 8:
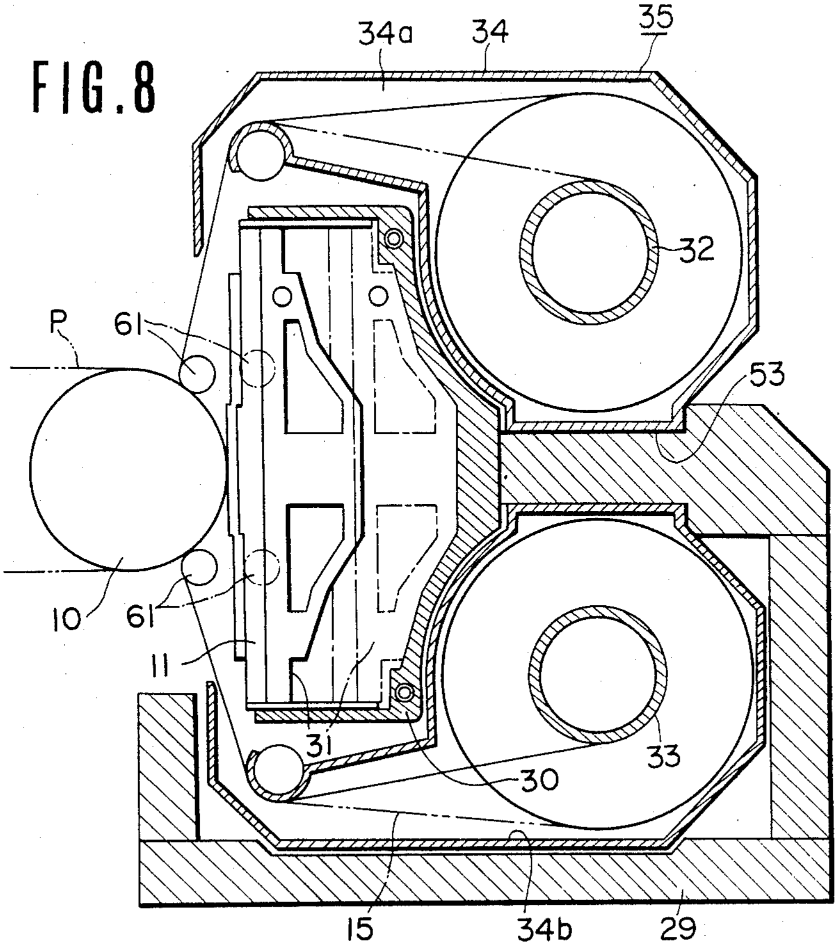
FIG. 8 is a vertical sectional side view of the thermal transfer unit, shown in an enlarged scale.

As illustrated in detail in FIG. 8, the thermal head 11 is fixedly secured to a head holder 31 serving also as a heat radiator, the rear part is surrounded by a member 30 which is attached to the frame block 29. As is apparent from the drawing, the thermal transfer ribbon 15 is assembled with winding cores 32 and 33 in the form of a cassette, the winding cores 32 and 33 allowing both ends of the thermal transfer ribbon 15 to be wound thereabout, and the thus assembled ribbon cassette 35 is detachably mounted on the frame block 29. The frame block 29 is die cast or molded of plastic material in the integral structure in the substantially U-shaped cross-sectional configuration to assure sufficiently high mechanical strength, and positioning accuracy of the ribbon cassette 35 can be improved by engaging the one winding core receiving portion of the ribbon cassette 35 to the U-shaped structure of the frame block 29.

Figure 9:
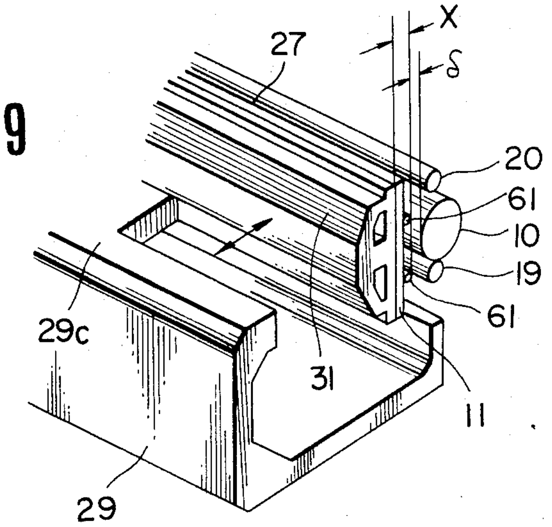
FIG. 9 is a fragmental perspective view of the thermal transfer unit, particularly illustrating how the thermal head and the ribbon guides are spaced away from the platen.

Further, as illustrated in FIG. 9, the head holder 31 with the thermal head 11 attached thereto is adapted to move by a distance X in such a direction that it comes in contact or out of contact with the platen 10. As required, a clearance $\delta$ can be formed in the space as defined between the ribbon guides 61 and the platen 10 as to allow a thermal transfer ribbon 15 to be inserted therethrough. Thus, reciprocable movement of paper P and attaching and detaching operation of the ribbon cassette 35 can be carried out easily and reliably.

Figure 10:
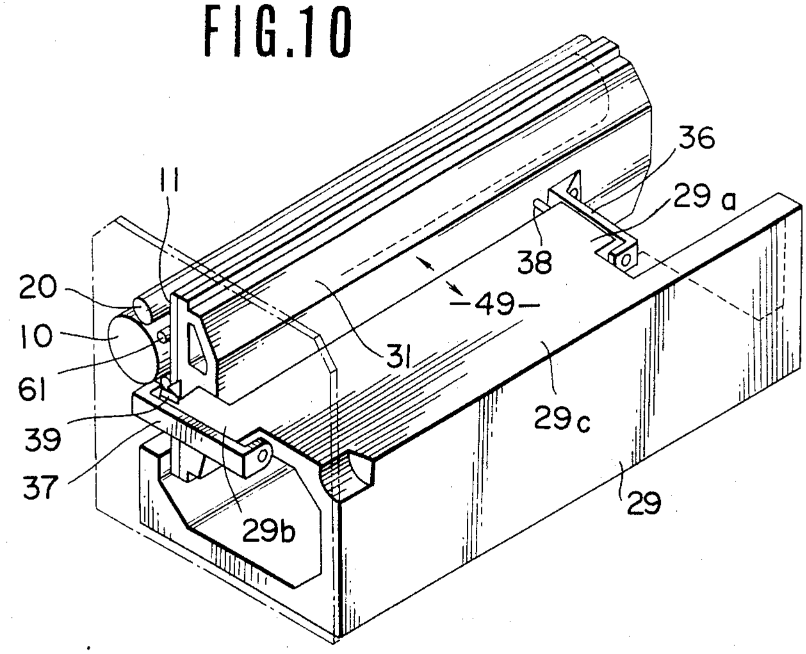
FIG. 10 is a perspective view of the thermal transfer unit, particularly illustrating how the thermal head and the head holder are supported in the thermal transfer unit.
Figure 11:
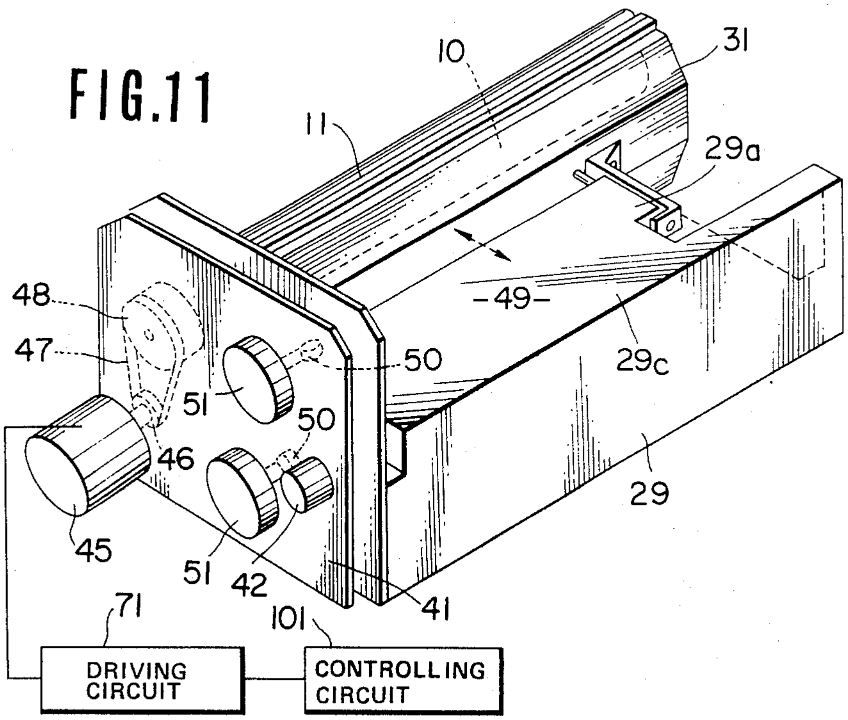
FIG. 11 is a perspective view of the thermal transfer unit, particularly illustrating how driving systems are arranged for the platen, the thermal transfer ribbon and the thermal head.

Specifically, as illustrated in FIGS. 10 and 11, guide shafts 38 and 39 are secured to the head holder 31 with the aid of stays 36 and 37 so that the middle part of the guide shafts 36 and 37 is carried by linear bearings fitted into the bearing portions 29*a* and 29*b* of the frame block 29.

Figure 15:
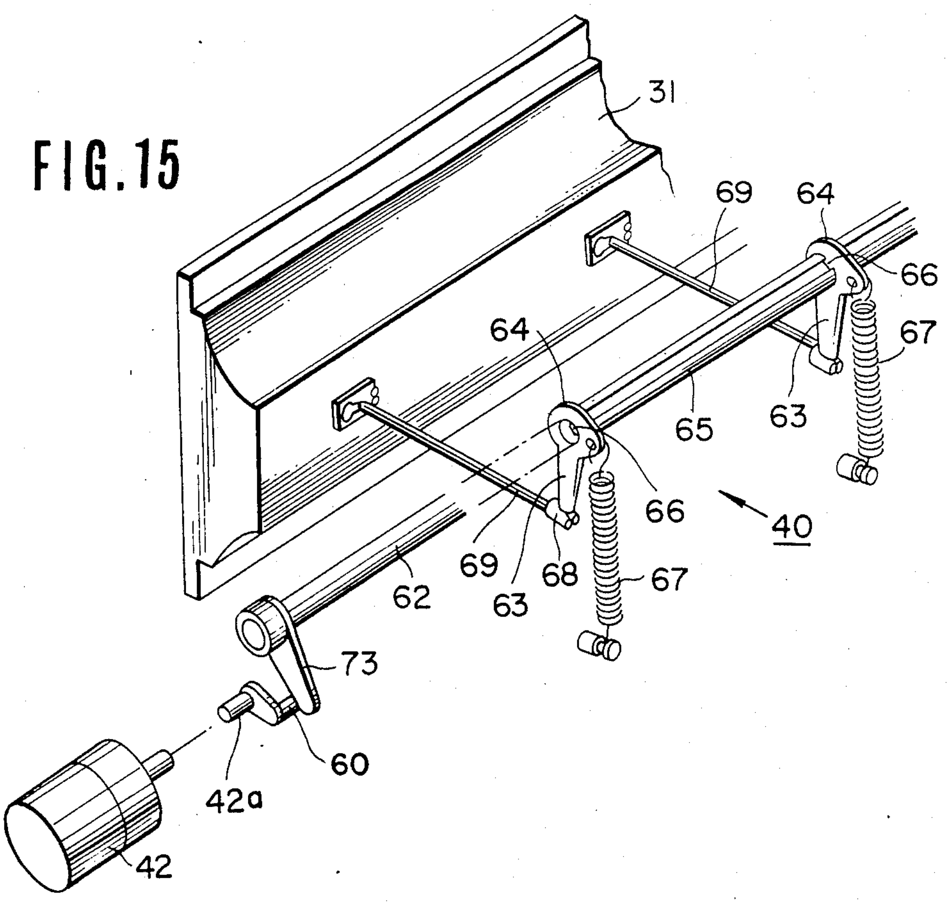
FIG. 15 is a fragmental perspective view of the thermal transfer unit, particularly illustrating how the mechanism is actuated.

The thus reciprocally supported head holder 31 is controlled by means of a head displacement mechanism 40 (see FIG. 15) so as to come in contact or out of contact with the platen 10.

Further, as illustrated in FIG. 11, a motor 42 for the thermal head is mounted on the frame 41 and a motor 45 for the platen in the form of a pulse motor is mounted there so that the driving force of the motor 45 is transmitted via a power transmission mechanism to the platen 10, which serves also as means for displacing material to be image transferred, the power transmission mechanism comprising pulley 46, belt 47 and pulley 48 so as to rotate the platen 10 in the normal or reverse direction. Further, the frame 41 carries a pair of motors 51 for driving the ribbon. The motors are positioned to correspond to the cassette fitting section 49, where the ribbon cassette 35 is fitted to the thermal transfer printer. As is apparent from the drawing, each of the motors 51 is provided with a coupling 50 on its driving shaft.

Figure 13:
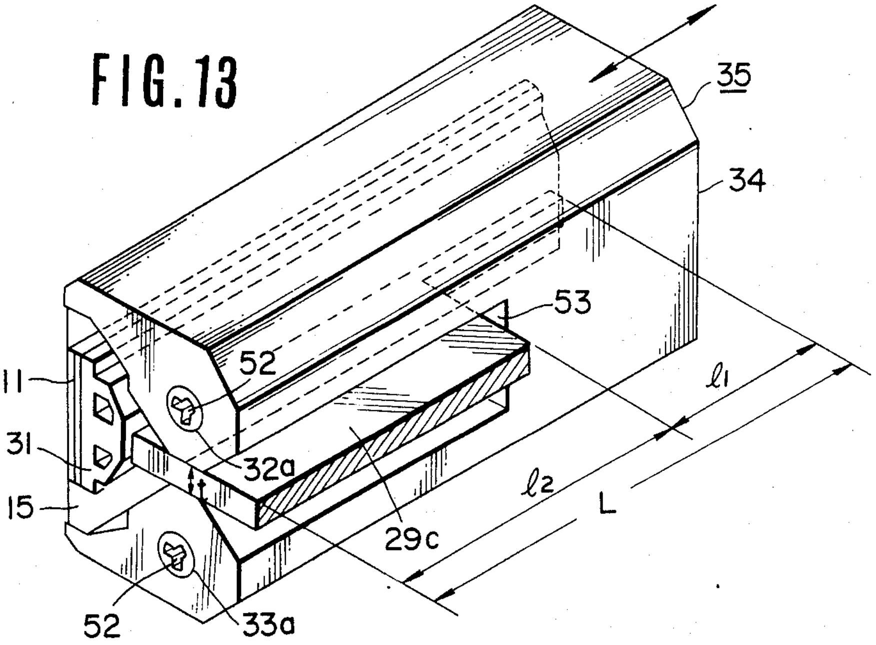
FIG. 13 is a fragmental perspective view of the thermal transfer unit, particularly illustrating how the ribbon cassette is fitted thereto.
Figure 14:
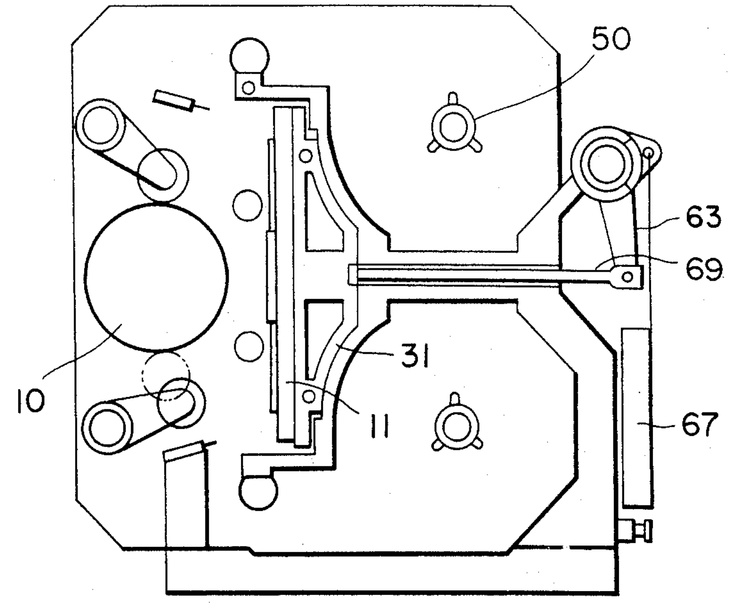
FIG. 14 is a vertical sectional side view of the thermal transfer unit, particularly illustrating the mechanism in FIG. 13 with the ribbon cassette removed therefrom.

On the other hand, as illustrated in FIG. 13, the winding cores 32 and 33 for winding thereabout both the ends of the thermal transfer ribbon 15 include driving power receiving end portions 32*a* and 33*a* which are exposed to the outside via punched holes on the end wall surface of the case 34, the driving power receiving end portions 32*a* and 33*a* being formed with engagement recesses 52 on their foremost end.

When the ribbon cassette 35 is completely fitted at the predetermined position, the couplings 50 are brought in engagement to the engagement recesses 52 on the winding cores 32 and 33. Thus, the thermal transfer ribbon 15 is ready to be wound.

Figure 12:
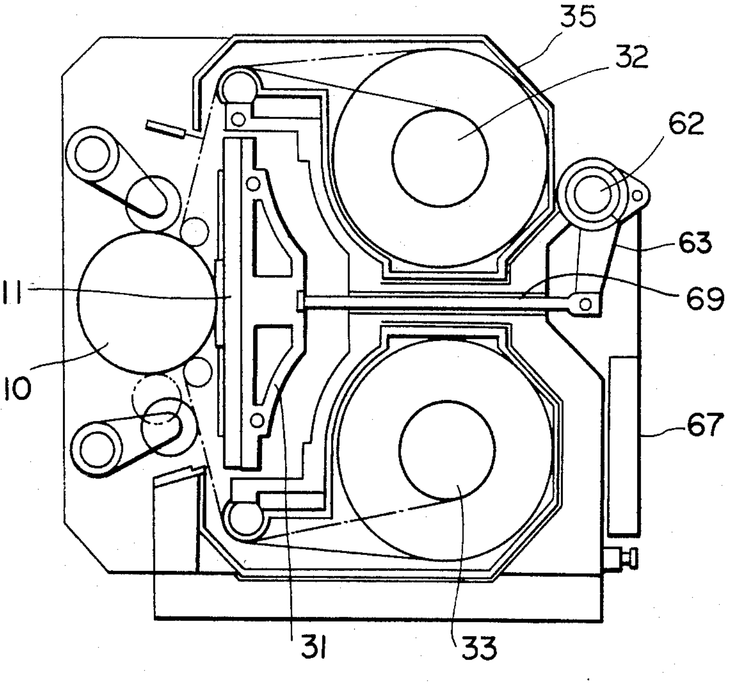
FIG. 12 is a vertical sectional side view of the thermal transfer unit, particularly illustrating the mechanism for displacing the thermal head to come in contact and out of contact with the platen.

As is apparent from FIGS. 8 and 12, the ribbon cassette 35 includes two winding cores 32 and 33 extending in parallel with one another so as to allow both the ends of the thermal transfer ribbon 15 to be firmly anchored thereat, and the ribbon 15 is housed in the case 34 is such a manner that a part thereof is exposed to the outside at the position located between the platen 10 and the thermal head 11.

Between both winding core receiving portions 34*a* and 34*b* of the case 34 is formed a slit 53 which extends in the axial direction of the winding cores 32 and 33 in the opened state on the one end side. (See FIG. 13) The driving power receiving end portions 32*a* and 33*a* are located on the opened end side of the slit 53.

Further, as illustrated in FIGS. 8, 12 and 13, the case 34 of the cassette 35 is designed in the substantially U-shaped cross-sectional configuration to form the hollow space in which the member 31 and the thermal head 11 attached thereto are housed at the position between the exposed part of the thermal transfer ribbon 15 and the case 34.

The width of the thermal transfer ribbon 15 is larger than the maximum winding diameter obtained by the winding cores 32 and 33 and the cut depth of the slit 53 is more than half of the width of the thermal transfer ribbon 15.

Thus, the whole length L of the case 34 defining the ribbon cassette 35 is constructed by two portions, one of them being an area having a length $l_1$ of which both upper and lower parts are jointed to one another and the other one being an area having a length $l_2$ which is divided into upper and lower parts with the slit 53 being located therebetween. The width t of the slit 53 is appreciably larger than the thickness of the cassette fitting portion 29*c* of the frame block 29 and the cut depth $l_2$ of the slit 53 is substantially equal to the width of the cassette fitting portion 29*c*.

When the ribbon cassette 35 is to be mounted, the end face of the cassette fitting portion 29*c* is located opposite to the opened end face on the slit 53 and the ribbon cassette is then thrusted forward in the longitudinal direction thereof (in the axial direction of the platen) until the cassette fitting portion 29*c* is engaged to the slit 53 as illustrated in FIG. 13. On the contrary, when it is to be dismounted, operation is performed in the reverse direction.

Incidentally, mounting and dismounting operation of the ribbon cassette 35 is achieved while a door 55 fitted to the cassette mounting and dismounting port 54 on the focus side surface of the housng 1 is held in the opened state (see FIG. 1).

Figure 16:
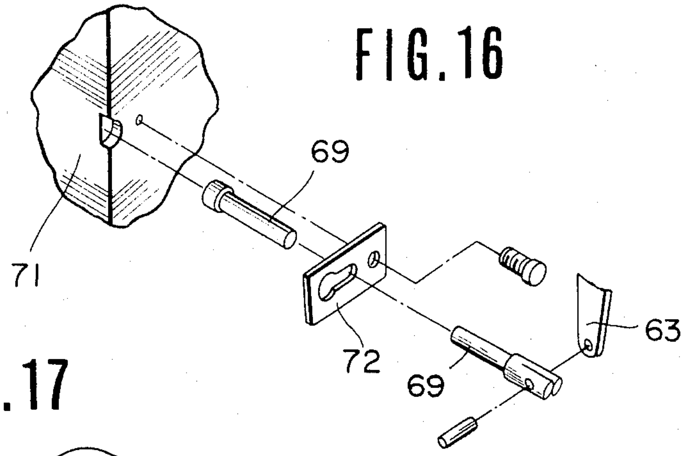
FIG. 16 is a fragmental perspective view of the thermal transfer unit, particularly illustrating a part of the mechanism.

A description now will be made of the head displacing mechanism 40. As illustrated in FIG. 11, the motor frame 41 has a motor 42 mounted thereon which is adapted to rotate in both the directions, and the driving shaft 42*a* of the motor 42 carries a cam 60 at the free end thereof as is apparent from FIG. 15. Further, the motor frame 41 has a thrusting shaft 62 rotatably supported at the position upwardly of the motor 42. The thrusting shaft 62 has a link 73 integrally connected thereto at the one end so that the link 73 comes in engagement to the cam 60 on the driving shaft 42*a*. Further, the thrusting shaft 62 carries a pair of thrusting arms 63 which are spaced away from one another at a predetermined distance in the middle area thereof. Each of the thrusting arms 63 is formed with an insert hole 64 at the upper end so that the thrusting shaft 62 is inserted through the holes 64. The thrusting shaft 62 is formed with a longitudinally extending groove 65 and a projection 66 is projected inwardly of the inner periphery of the insert hole 64 on each of the thrusting arms 63 so that it is fitted into the groove 65 on the thrusting shaft 62. A spring 67 is operatively connected to the upper end of each of the thrusting arms 63 so as to normally turn the thrusting arms 63 in the clockwise direction. Each of the thrusting arms 63 pivotally carries a thrusting rod 69 on the lower end with the aid of a pin 68, the thrusting rod 69 serving as power transmission member. The thrusting rods 69 extend in the area as defined between both the winding cores 32 and 33 of the ribbon cassette 35 (see FIG. 12) to be fitted into holes 71 (see FIG. 16) on the head holder 31 without occurrence of incorrect alignment with the aid of shaft receivers 72.

When the thermal head 11 is brought in pressure contact with the platen 10, the cam 60 is caused to rotate in the clockwise direction by means of the motor 42. As the link 73 is released from the cam 60, the thrusting levers 63 are turned in the clockwise direction under the effect of biasing force of the springs 67. Turning movement of the thrusting levers 63 allows the thrusting rods 69 to move forward to thrust the thermal head until the latter comes in pressure contact with the platen 10.

Next, when the thermal head 11 is displaced away from the platen 10, the cam 60 is rotated in the anticlockwise direction by means of the reversible motor 42. Thus, the thrusting shaft 62 is rotated in the anticlockwise direction via the link 73 and thereby the thrusting levers 63 are turned in the anticlockwise direction against biasing force of the springs 67. As a result, the thrusting rods 69 are retracted whereby the thermal head 11 is displaced away from the platen 10.

Figure 19:
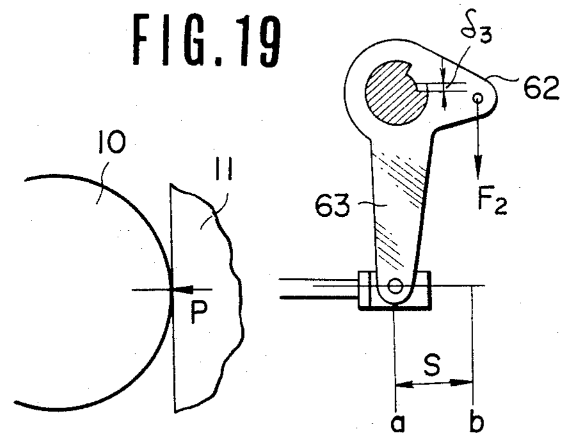
FIG. 19 is a fragmental side view of the mechanism, particularly illustrating the operative relation at a time when the thermal head is brought in pressure contact with the platen.

It should be noted that when the thermal head 11 is brought in pressure contact in that way, a clearance $\delta_3$ is formed between the groove 65 on the thrusting shaft 62 and the projection 66 in the insert hole 64 of the each of the thrusting arms 63 as illustrated in FIG. 19 so that resilient force of the springs 67 is transmitted directly to the platen 10.

Figure 17:
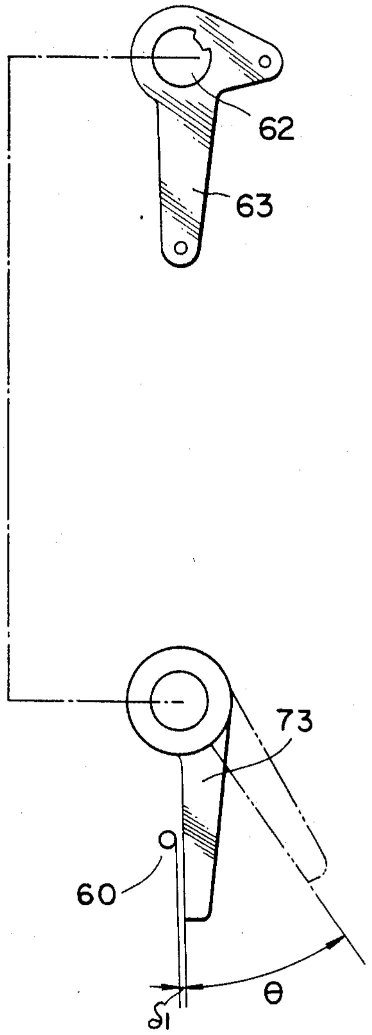
FIG. 17 is a fragmental side view of the mechanism, particularly illustrating the operative relation between the thrusting arm and the link.
Figure 18:
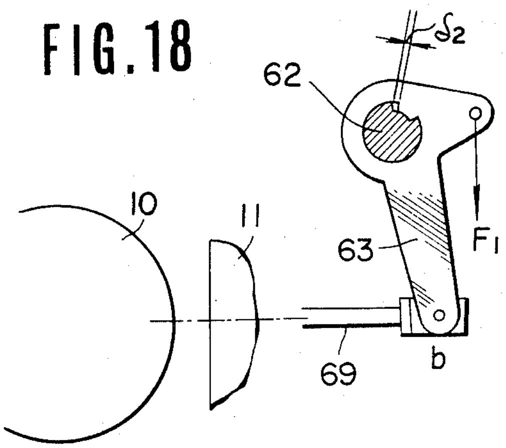
FIG. 18 is a fragmental side view of the mechanism, particularly illustrating the operative relation at a time when the thermal head is released from pressure contact with the platen.

When the thermal head 11 is released from pressure contact, a clearance $\delta_2$ is formed between the groove 65 on the thrusting shaft 62 and the projection 66 in the insert hole 64 of each of the thrusting arms 63 as illustrated in FIG. 18, wherein an inequality $\delta_3 < \delta_2$ is established between both the clearances $\delta_2$ and $\delta_3$. As is apparent from FIG. 17, the clearance $\delta_3$ is obtainable from the clearance $\delta_1$ as defined between the cam 60 and the link 73. The parameters $\delta_1$, $\delta_3$, $\theta$ and s are determined in dependence on lever ratio relative to the thrusting lever.

As described above, since the apparatus of the invention is constructed such that a motor 42 serving as driving power source is mounted outside the transfer material cassette 35 and power transmission members are extended in the space as defined between a pair of winding cores 32 and 33 on the transfer material cassette 35 so as to transmit power of the motor 42 to the thermal head 11 to displace the latter, there is no necessity for preparing space required for mounting the motor 42 in the area between both the winding cores 32 and 33, resulting in the transfer material cassette 35 being designed in smaller dimensions.

Further, since the apparatus of the invention is constructed such that power is transmitted by way of a pair of thrusting rods 69 extending in parallel with one another, the thermal head 11 can be displaced correctly in the horizontal direction while contact pressure is distributed uniformly over the platen 10.

While the present invention has been described above with respect to a single preferred embodiment, it should of course be noted that it should not be limited only to this but various changes or modifications may be made in any suitable manner without departure from the spirit and scope of the invention.

What is claimed is:

1. An image building apparatus comprising:

a frame member;

a platen positioned adjacent said frame member;

a recording head mounted on said frame member adjacent said platen and movable relative to said platen between a first position in contact with said platen and a second position out of contact with said platen;

a cassette, detachably mounted on said frame member, including a pair of closely adjacent winding cores and a supply of ribbon-shaped image transference material wound on said pair of winding cores, said image transference material passing between said platen and said recording head, said recording head being positioned between said platen and said winding cores;

driving power source means for moving said recording head between said first and second positions, said driving power source means being positioned opposite said recording head with respect to said cassette; and driving power transmitting means, extending between said winding cores of said cassette, for transmitting driving power from said driving power source means to said recording head.

2. An image building apparatus as defined in claim 1, wherein said driving power source means includes first and second driving power sources, said first driving power source moving said recording head in the direction away from said platen and said second driving power source moving said recording head toward and into pressure contact with said platen with a predetermined pressure exerted thereon.

3. An image building apparatus as defined in claim 2, wherein said first driving power source comprises a pulse motor and said second driving power source comprises spring means.

4. An image building apparatus as defined in claim 1, wherein said driving power transmitting means includes a pair of thrusting rods extending between said winding cores of said cassette, said thrusting rods being reciprocably movable along their respective axes to transmit driving power from said driving power source means to said recording head.

5. An image building apparatus as defined in claim 1, wherein said driving power transmitting means includes a pair of thrusting rods, a rotatable thrusting shaft, and a pair of thrusting arms each having a first end fixedly mounted on said thrusting shaft and a second end extending from said thrusting shaft, each of said thrusting rods being connected between said recording head and said second end of an individual one of said thrusting arms, said thrusting arms being reciprocably movable along their respective axes to move said recording head in response to rotation of said thrusting shaft; and said driving power source means includes a pulse motor means for causing said thrust shaft to rotate in a first rotational direction so as to move said recording head away from said platen, and spring means for causing said thrusting shaft to rotate in a second rotational direction so as to move said recording head toward and into pressure contact with said platen.

6. An image building apparatus as defined in claim 1, wherein said recording head comprises a thermal head, and said image transference material has a thermally fusible coloring agent coated thereon.

7. An image building apparatus as defined in claim 5, wherein said pulse motor means includes a pulse motor shaft and a cam portion mounted on said pulse motor shaft, and said driving power transmitting means further includes a link member fixedly mounted on said thrusting shaft, said cam portion engaging said link member to cause said thrusting shaft to rotate in said first rotational direction.

* * * * *